United States Patent [19]

Tournier

[11] 4,299,009

[45] Nov. 10, 1981

[54] MACHINE FOR SEPARATING THE BONE AND THE FLESH FROM THE FEET OF SLAUGHTERED UNGULATES

[76] Inventor: Claude Tournier, Lioujas, 12000 Rodez, France

[21] Appl. No.: 102,994

[22] Filed: Dec. 12, 1979

[30] Foreign Application Priority Data

Mar. 28, 1979 [FR] France .................................. 79 08278

[51] Int. Cl.³ .............................................. A22C 17/04
[52] U.S. Cl. .......................................... 17/1 G; 17/21
[58] Field of Search ...................... 17/1 G, 62, 21, 50, 17/46

[56] References Cited

U.S. PATENT DOCUMENTS

| | | | |
|---|---|---|---|
| 1,960,643 | 5/1934 | Lorenzen | 17/21 |
| 2,642,619 | 6/1953 | Coad | 17/21 |
| 3,403,421 | 10/1968 | Bedford | 17/21 |
| 4,025,986 | 5/1977 | Koken | 17/21 |

*Primary Examiner*—Willie G. Abercrombie
*Attorney, Agent, or Firm*—Larson and Taylor

[57] ABSTRACT

A machine for boning feet comprises on a frame, fixed immobilization means and a movable extraction member constituted by at least one set of jaws. In order to bone the feet of hoofed animals, said immobilization means are constituted by at least one set of jaws designed to hold the foot to be boned, the movable means gripping at least the skin of the foot.

8 Claims, 6 Drawing Figures

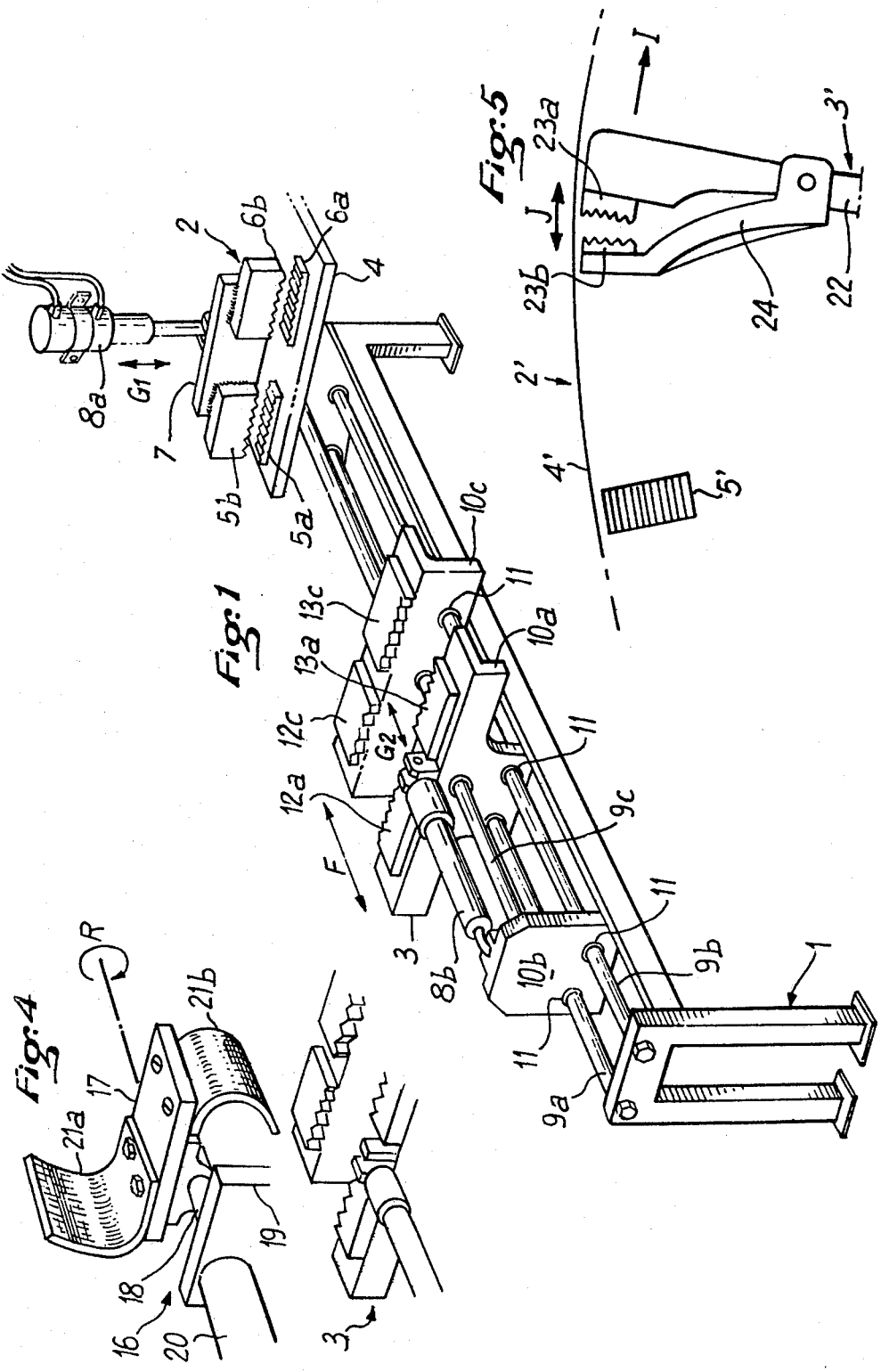

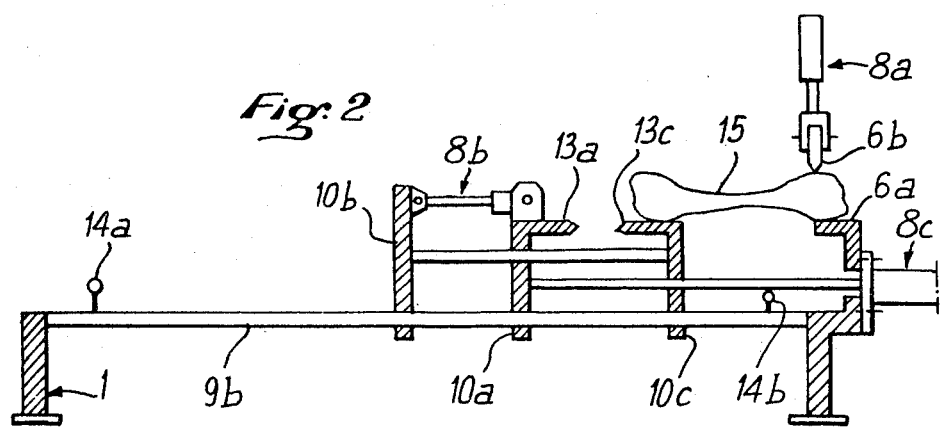
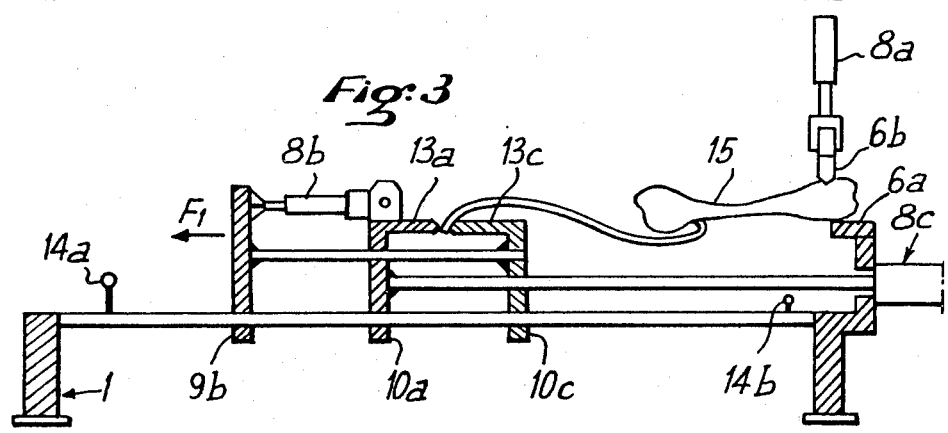
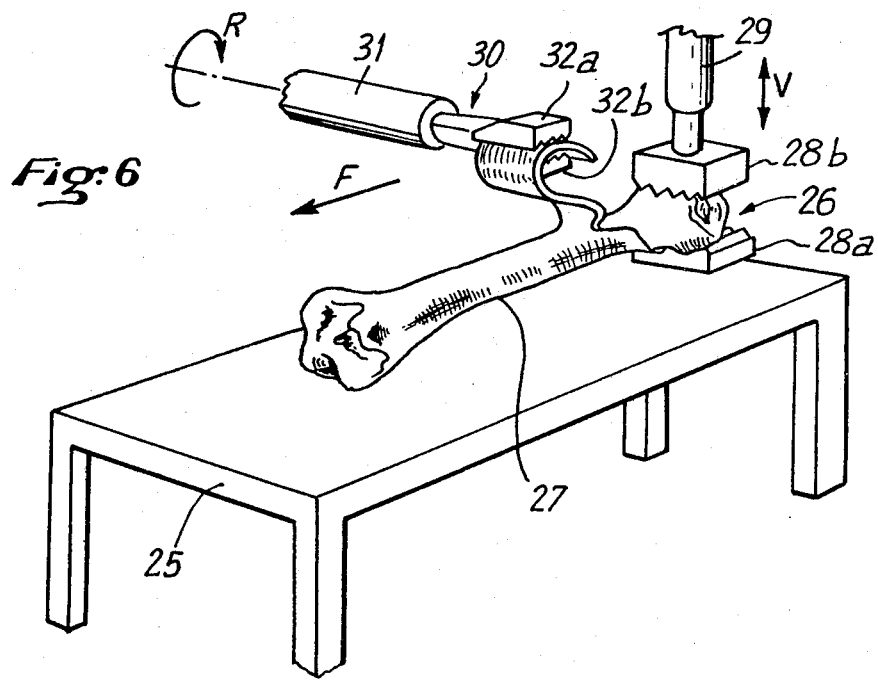

MACHINE FOR SEPARATING THE BONE AND THE FLESH FROM THE FEET OF SLAUGHTERED UNGULATES

BACKGROUND OF THE INVENTION

1. Field of the Invention

The present invention relates to a machine enabling the bone and the flesh of the foot of a slaughtered hoofed animal to be separated. These bodies, rich in vitamins, proteins and mineral salts, both provide a qualitative supply of products such as fertilizers, gelatins and animal foods.

2. Description of the Prior Art

Boning machines have already been proposed for parts such as chicken thighs, including a sliding carriage bearing jaws designed to close on the bone to be extracted, the immobilization of the non-extracted portion, namely the meat, being effected by abutment against a plate provided with a passage slot for the bony portion.

Such a machine is however incapable of being converted for the boning of feet of ungulate animals.

It is consequently an object of the invention to provide a machine for boning such feet which is simple in design and construction.

It is another object of the invention to provide a boning machine for such feet which is practical in use.

It is a further object of the invention to provide a machine which is of economical cost price.

GENERAL DESCRIPTION OF THE INVENTION

According to the invention, the boning machine for feet, which comprises a foot holding means and a movable extraction member constituted by at least one set of jaws, is characterized by the fact that to bone such feet, said immobilization means are constituted by at least one set of jaws designed preferably to hold the foot, the movable means preferably gripping the skin of the foot, previously cut.

The articulated part of the set of jaws of the movable extraction member advantageously moves along an axis parallel to the plane of the movements of this member, whilst the articulated part of the set of jaws of the fixed gripping member is moved along an axis perpendicular to said plane. Thus, it suffices to position the bone and the cut skin of the foot between the appropriate jaws and then to move the movable extraction member by suitable means so that the skin is caused to be detached from the bonds which hold it to the bone.

According to a first embodiment of the invention the path followed by the movable extraction member is rectilinear. A machine so designed is capable of adaptation to several sets of jaws and permits through this fact the boning of several feet at the same time.

According to another embodiment of the invention, the path followed by the movable extraction member is curvilinear, considerably limiting the space occupied by the machine putting this form of path into use.

Other features and other advantages of the present invention will emerge from reading the description which follows of two embodiments according to the invention, the first corresponding to a boning machine adopting a rectilinear path for the movable extraction member, and the second to a machine adopting a curvilinear path. These two examples are to be taken as non-limiting in character and are described with reference to the accompanying drawings.

BRIEF DESCRIPTION OF THE DRAWINGS

In the drawings:

FIG. 1 is a perspective view of a first embodiment of a boning machine according to the invention enabling two such feet to be boned at the same time;

FIGS. 2 and 3 are diagrammatic views in vertical section illustrating the operation of the embodiment of FIG. 1;

FIG. 4 is a perspective view of an accessory associated with the frame of the embodiment shown in FIG. 1;

FIG. 5 is a diagrammatic view from above of a second embodiment of a boning machine according to the invention;

FIG. 6 is a perspective view of a modification of the boning machine according to the invention.

DESCRIPTION OF PREFERRED EMBODIMENTS

The machine shown in the drawing of FIG. 1 is mounted on a frame 1 composed essentially of steel sectional bars assembled so as to present the machine to the user at a height suitable for its manipulation.

This machine is divided into two parts: a fixed member 2, anchored by an iron band or any other equivalent means to the frame 1, and a movable member 3 sliding along an axis symbolized by the double-headed arrow F.

The member 2 is fixed at one of its ends to the frame 1 and is composed of a plate 4 on which are welded the lower jaws 5a and 6a of two sets aligned on an axis at right angles to the plane of longitudinal symmetry of the machine. The upper jaws 5b and 6b of these sets are pivoted by association with a lifting arm 7 driven by a to-and-fro movement (arrow G1) caused by means of a vertical jack 8a. The surfaces of the jaws designed to be in contact are ribbed in order to obtain a better grip on the object engaged between them.

As for the member 3, it slides as indicated by the arrow F on two parallel guide rails 9a and 9b, tubular in shape and extending horizontally over the whole length of the frame 1. This member 3 comprises a carriage 10a contained laterally by a rectangular flange 10b and by a profiled support part 10c with two angle arms. The flange 10b and the support part 10c are connected by a cylindrical cross-rod 9c traversing from side-to-side the carriage 10a which has the same profile as the part 10c. It will be noted that the lower portion of the three elements 10a, 10b, 10c, is doubly perforated to permit the passage of the two rails 9a, 9b, and thus contribute to the stability of the whole of the member 3 moving over said rails. Advantageously, the bushings 11 equip the openings formed in the various elements to reduce the intensity of the frictional forces. The horizontal wings of the elements 10a and 10c carry jaws, 12a, 13a respectively, for the carriage, and 12c, 13c for the support part. These jaws are identical with the preceding ones and the jaws 12c, 13c are driven by a to-and-fro movement (arrow G2) generated by means of a horizontal jack 8b fixed between the flange 10b and the carriage 10a. In fact, when the jack 8b is actuated, the latter moves the flange 10b with respect to the carriage 10a, or vice versa, and as this flange 10b is connected by the cross-rod 9c to the support part 10c, the manipulation of the jack 8b hence imposes the same movement on the support 10c and on the associated jaws 12b, 13b.

To ensure the driving of the member 3 along the rails 9a, 9b, in a movement portrayed, at the beginning of the present description, by the arrow F, a jack 8c is arranged horizontally, as can be seen in FIGS. 2 and 3, so that the body of this jack is fixed with respect to the frame 1 and so that its head is supported on the vertical wing of the carriage 10a to which it is held by suitable fastening means. It will be understood from this point that the movements of the head of the jack 8c define those of the member 3 along the rails 9a and 9b.

Of course, the arrangement of the movable member 3 could be designed in any other manner known in itself, and notably as regards the position and the number of the rails and of the cross-members, to comply with the requirements of solidity and reliability. According to a particularly advantageous characteristic of the invention, the three jacks 8a, 8b, 8c are connected to a hydraulic center programmed by means of two adjustable limit switches 14a and 14b, arranged in the path of the member 3 and more particularly of the carriage 10a, to carry out the following operations.

In a first stage (FIG. 2), the end of a foot or trotter 15 freed from its hoof is engaged between the jaws 6a, 6b of the gripping member, and the skin of this foot, previously cut, between the jaws 13a and 13c. Obviously, the operation is similar for the two other sets of jaws 5a, 5b and 12a, 12b.

In a second stage (FIG. 3), controlled by the user of the machine, the two jacks 8a, 8b are actuated to cause the closing of the jaws in order to imprison the bone and the skin of the feet. Then, once the jaws are closed, the jack 8c is actuated automatically, causing the movement of the carriage 10a in the direction indicated by the arrow F1, thus detaching the skin from the bone.

In a third stage, the carriage 10a hits the switch 14a positioned along the length of the processed foot. The extraction member 3 is stopped, the jaws open, releasing the skin and the bone which can be manually removed.

In a fourth and last stage, the extraction member 3 comes back to its starting position determined by the location of the switch 14b.

To increase the conditions of operational safety of such a machine, Applicant has installed an accessory 16, illustrated in FIG. 4, and designed to eject the skin when the jaws of the extraction member 3 are opened.

This accessory 16 includes a plate 17 of parallelepipedic shape mounted on an axle 18 rotated in a bearing-support 19, fast to the carriage 1, by means of a motor 20 also connected to the programmed hydraulic center. Thus, when the jaws of the extraction member 3 are opened, the motor 20 is actuated, rotating the plate 17 (in the direction indicated by the arrow R) which, by means of flexible strips 21a and 21b fixed on its two surfaces, enables the skin adhering to the jaws to be disengaged from said member.

In the drawing of FIG. 5, another embodiment of the invention is shown. This machine also comprises a fixed gripping member 2' fast to the carriage (not shown), and a movable extraction member 3'.

The member 2' is constituted by a circular horizontal platform 4' defining the general bulk of the machine and a set of jaws 5' fast to this platform and whose articulated jaw is moved over an axis perpendicular to the plane of the platform 4'.

The member 3' is constituted by an arm 22 hinged around an axle arranged at right angles to said platform to describe a circular path illustrated by the arrow I. This arm 22 is provided at its outer end with a set of jaws 23a, 23b, arranged by means of a hinged arm 24 to be opened and closed as shown by the arrow J.

The operation of this machine being identical with that of the preceding one, it is consequently, unnecessary to recall thereof the various operating stages.

Reference is now made to FIG. 6.

At the end of a table 25 forming the carriage, a fixed gripping member 26 is mounted, holding the bone portion of the end of a cow foot 27 between jaws 28a and 28b, of which one is ensured of a to-and-fro movement, along the arrow V, by a jack 29.

The movable extraction member 30 includes a cylinder 31 driven with a rotary motion around its axis, along the arrow R, by motor means (not shown). The end of the cylinder 31 bears a pair of jaws 32a, 32b pivoted on the end of the cylinder and which seize the skin. When the cylinder 31 rotates the skin is detached along the foot and is wound around the pair of jaws 32a, 32b. The jaws can be opened in pincer fashion, the ends being opened under the effect of an axial force, by means of control members sliding inside the cylinder.

The cylinder 31 can also be borne, with its drive means, by a carriage (not shown) similar to the carriage 3 and moved parallel to the table 25, along the arrow F, which enables, during the whole of the winding, the orientation of the skin-stripping force in a vertical direction.

I claim:

1. Machine for boning feet of ungulate animals, comprising: a fixed holding means for holding a foot at one end thereof, a movable extraction member for gripping a skin portion of said foot, said extraction member being movable along a path in a horizontal plane beneath said foot between a first position close to said holding means and a second position remote from said holding means, wherein said holding means comprises a set of jaws relatively movable in a direction perpendicular to said plane, and said extraction member comprises a set of jaws relatively movable in a direction parallel to said plane.

2. Boning machine according to claim 1, wherein the path followed by the movable extraction member is rectilinear.

3. Boning machine according to claim 1, wherein the path followed by the movable extraction member is curvilinear.

4. Boning machine according to claim 2, wherein said movable extraction member is borne by a carriage slidably mounted on at least one longitudinal horizontal guide rail.

5. Boning machine according to claim 3, wherein said movable extraction member is borne by an arm hinged around a vertical axis.

6. Boning machine according to claim 5, comprising an accessory fast to the frame, constituted by a rotary arm designed to disengage the skin after opening the jaws of the movable extraction member.

7. Machine for boning feet of ungulate animals comprising a fixed holding means for holding a foot at one end thereof, said holding means comprising a set of jaws, a movable extraction member for gripping a skin portion of said foot, said extraction member comprising a set of jaws, wherein said extraction member is rotatable about an axis passing therethrough so as to wind the skin around itself, and is simultaneously movable along a path parallel to the longitudinal axis of the foot to be displaced by a rectilinear movement perpendicular to said axis.

8. Boning machine according to claim 7, wherein the movable extraction member comprises a cylinder rotating around its axis and bearing at its end a set of jaws gripping the skin.

* * * * *